(12) United States Patent
Boberg et al.

(10) Patent No.: US 6,239,938 B1
(45) Date of Patent: May 29, 2001

(54) MULTI-ACTUATOR OPTICS DRIVE SYSTEM FOR LASER SERVOWRITING

(75) Inventors: Arne B. Boberg, Shoreview; Gary J Bohlman, New Brighton, both of MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/252,049

(22) Filed: Feb. 17, 1999

(51) Int. Cl.[7] ................................................. G11B 21/02
(52) U.S. Cl. .................. 360/75; 360/78.11; 360/77.03; 369/44.26; 250/559.01; 359/201
(58) Field of Search .................. 360/55, 75, 78.11, 360/77.03, 264.5, 266.2; 369/14, 44.26, 44.35, 44.39, 111, 219, 249; 250/559.01; 356/445; 310/51; 359/201, 202, 203

(56) References Cited

U.S. PATENT DOCUMENTS

| | | |
|---|---|---|
| 4,315,283 | 2/1982 | Kinjo et al. . |
| 4,942,562 * | 7/1990 | Suzuki ................................. 369/111 |
| 4,961,123 | 10/1990 | Williams et al. . |
| 5,120,927 | 6/1992 | Williams et al. . |
| 5,155,715 * | 10/1992 | Ueyema et al. .................. 369/44.26 |
| 5,279,775 | 1/1994 | Thomas et al. . |
| 5,283,773 | 2/1994 | Thomas et al. . |
| 5,334,849 | 8/1994 | Thomas et al. . |
| 5,726,879 * | 3/1998 | Sato ....................................... 360/75 |

* cited by examiner

Primary Examiner—Alan T. Faber
(74) Attorney, Agent, or Firm—Eric D. Levinson

(57) ABSTRACT

Drive systems for moving the optics sled in a laser servowriting system used to provide a servo pattern on the media of a magnetic data storage disk are disclosed. The drive systems include multiple actuators located about the centroidal axis of the optics sled. Moments induced by the multiple actuators acting on the optics sled can be balanced by varying the forces applied to the optics sled by the actuators. Also disclosed are control systems and methods for balancing the forces provided by the actuators by varying the gains on the signals driving the actuators.

28 Claims, 7 Drawing Sheets

MULTI-ACTUATOR OPTICS DRIVE SYSTEM FOR LASER SERVOWRITING

The present invention relates to the field of drive systems for the optics in a laser servowriting system for providing servo patterns on magnetic data storage disks. More particularly, the present invention provides drive systems and methods using multiple actuators to move the optics in the laser servowriting system.

BACKGROUND

Laser servowriting is used in connection with flexible magnetic data storage disks to increase the storage density of the magnetic media by allowing for more precise positioning of the read/write heads. The increased precision in positioning is provided by using an optical servo system that detects an optical servo pattern formed on or in the surface of the disc. The optical servo pattern can consist of a large number of equally spaced concentric tracks. Each track can be a single continuous groove, a plurality of equally spaced pits, or a plurality of relatively short equally spaced grooves or stitches.

The optical servo pattern is typically formed using light energy, e.g., a laser, that is focused into a spot having the desired width of the tracks to be formed on the disk. The focused spot of laser energy is typically translated across the radius of the media by moving a lens and mirror arrangement located on an optics sled. The optics sled is translated over the desired distance and along the direction of the laser energy, thereby causing the focused spot of laser energy to also move.

Control over movement of the optics sled is an important issue because the location of the focused spot of laser energy is critical in formation of the desired optical patterns. Variations in the size or location of the focused spot can cause corresponding variations in the optical contrast and/or location of the optical patterns. Such variations can be detrimental to the storage of data on the resulting magnetic data storage discs.

Among the causes of variations in the location and/or size of the focused spot size are deviations in the movement and orientation of the optics sled carrying the optics used to both redirect and focus the laser energy. Among those deviations are changes in the pitch and yaw of the optics sled with respect to the media, as well as errors in the location of the optics sled as it translates across the radius of the media.

In addition to deviations such as pitch and yaw, vibrations induced in the optics sled can also cause variations in the optical track pattern. Those vibrations may be caused by the alignment of the actuator or actuators used to move the optics sled. Where the resultant force produced by the actuators is not directed through the center of mass of the optics sled, moments can be induced that can cause the optics sled to vibrate about one or more axes. In some instances, the speed of the laser servowriting process can be limited by those vibrations.

One attempt to reduce vibrations caused by the resultant force includes mounting additional balancing masses on the optics sled in an attempt to move the center of mass of the optics sled. By adjusting the position of the balancing mass or masses, it may be possible to reduce vibration of the optics sled by moving the center of mass into alignment with the resultant force produced by the actuator or actuators. Balancing masses are, however, difficult to adjust initially and may required readjustment after use. In addition, the additional mass can reduce the acceleration of the optics sled, thereby increasing cycle time.

SUMMARY OF THE INVENTION

The present invention provides a drive system for moving an optics sled in a laser servowriting system used to provide a servo pattern on the media of a magnetic data storage disk. The drive system includes multiple actuators located about the centroidal axis of the optics sled. Moments induced by the multiple actuators acting on the optics sled can be balanced by varying the forces applied to the optics sled by the actuators. The invention also includes a control system for balancing the forces provided by the actuators by varying the gains on the signals driving the actuators.

In one aspect, the present invention provides a laser servowriting system for providing a servo pattern on a magnetic data storage disk, the system including a linear guide; an optics sled including laser optics, the optics sled mounted on the linear guide for translational movement, wherein the center of mass of the optics sled moves along a centroidal axis as the optics sled moves along the linear guide; three or more actuators operatively connected to the optics sled, wherein the actuators move the optics sled along the linear guide; a laser source directing laser energy at the laser optics on the optics sled; and a rotation system for rotating a magnetic data storage disk during servowriting of an optical stitch pattern thereon In another aspect, the present invention provides a method of moving optics in a laser servowriting system during formation of a servo pattern on a magnetic data storage disk by providing an optics sled mounted on a linear guide for translational movement, wherein the center of mass of the optics sled moves along a centroidal axis as the optics sled moves along the linear guide; providing three or more actuators operatively connected to the optics sled, each of the actuators producing an actuator force to move the optics sled along the linear guide; and varying the actuator force provided by at least one of the actuators.

In another aspect, the present invention provides a drive system for moving the optics in a laser servowriting system for producing a servo pattern on a magnetic data storage disk, the system including a linear guide; an optics sled including laser optics, the optics sled mounted on the linear guide for translational movement, wherein the center of mass of the optics sled moves along a centroidal axis as the optics sled moves along the linear guide; and three or more actuators operatively connected to the optics sled, wherein the actuators move the optics sled along the linear guide.

As used in connection with the present invention, the term "centroidal axis" is the line along which the center of mass of an optics sled travels during laser servowriting.

DETAILED DESCRIPTION OF THE INVENTION

The present invention provides a drive system for moving an optics sled in a laser servowriting system using three or more actuators located about the centroidal axis of the optics sled to reduce vibrations induced during movement of the optics during servowriting. In addition, the multiple actuators also preferably allow for correction of errors in pitch and yaw of the optics sled.

Figure 1:
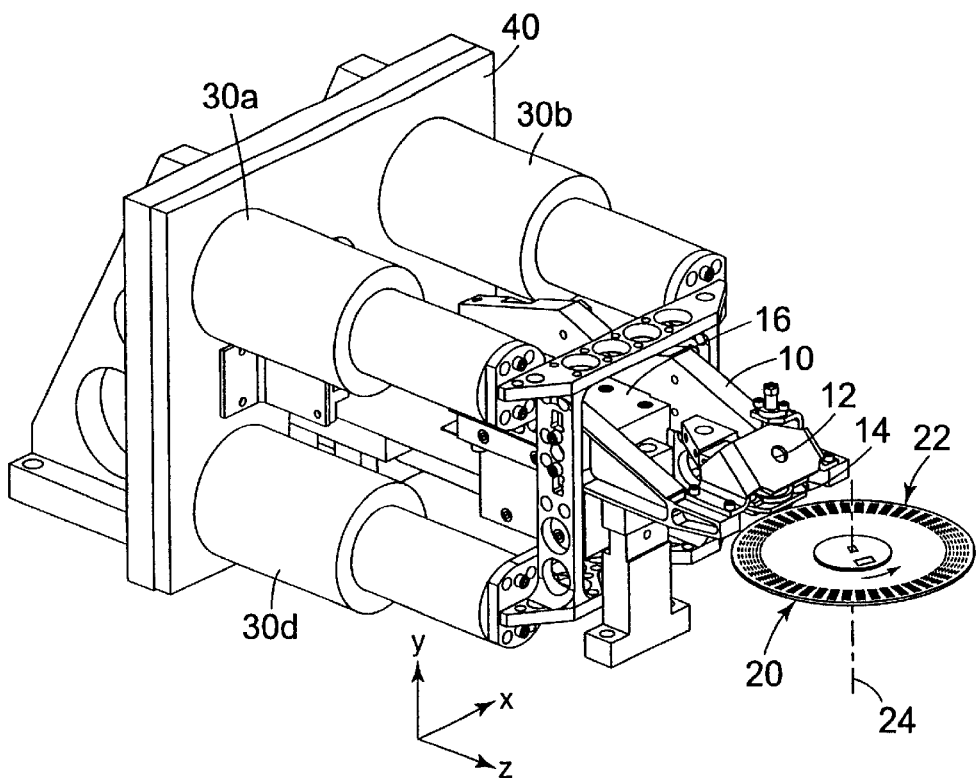
FIG. 1 is a perspective view of one laser servowriting system including multiple actuators for moving the optics sled according to the present invention.

One drive system according to the present invention is depicted in FIG. 1. The system includes an optics sled 10 on which a mirror 12 and lens 14 are mounted to redirect and focus a beam of laser energy (not shown) on a data storage disc 20 located below the mirror 12 and lens 14. By focusing the laser energy on the disc 20, an optical servo pattern 22 is created on the disk 20 that can be used to position the read/write heads of a disk drive during use of the disk 20.

The optics sled 10 includes framework on which the various components are mounted and the optics sled 10 is mounted for translational movement on a linear guide 16, e.g., a cross-roller bearing assembly or an air bearing slide. The preferred linear guide 16 is an air bearing slide because it provides some measure of mechanical isolation between the optics sled 10 and the remainder of the system to reduce the transmission of vibrations from the other components of the servowriting system to the optics sled 10. Other vibration isolation techniques could be used in conjunction with the air bearing slide 16 or in place of the air bearing slide as will be known to those skilled in the art.

The air bearing slide 16 is arranged such that the optics sled 10 moves across the surface of the disk 20. Typically, the optics sled 10 is moved radially across the disk 20, but it will be understood that the optics sled 10 could be moved along a chord/secant provided the focused laser spot was able to form the desired optical servo pattern 22 on the portion of the disk 20 used to store data.

Movement of the optics sled 10 is caused by multiple actuators 30a, 30b, 30c, and 30d (see FIG. 2) mounted between a fixed frame 40 and the optics sled 10. For simplicity, the actuators 30a–d may be referred to generally as "actuators 30" below unless a specific actuator is referenced. The position of the frame 40 is preferably fixed relative to the axis 24 about which the disk 20 is rotating. The preferred actuators 30 are voice coil actuators and they are preferably mounted for movement that is parallel to the movement of the optics sled 10 along the air bearing slide 16.

Figure 2:
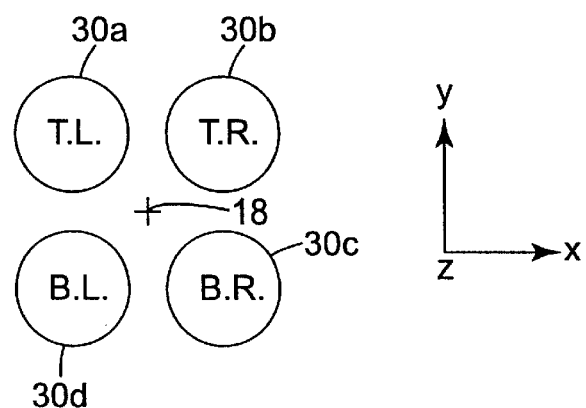
FIG. 2 illustrates the arrangement of the actuators with respect to the centroidal axis of the optics sled in the drive system of FIG. 1.
Figure 3:
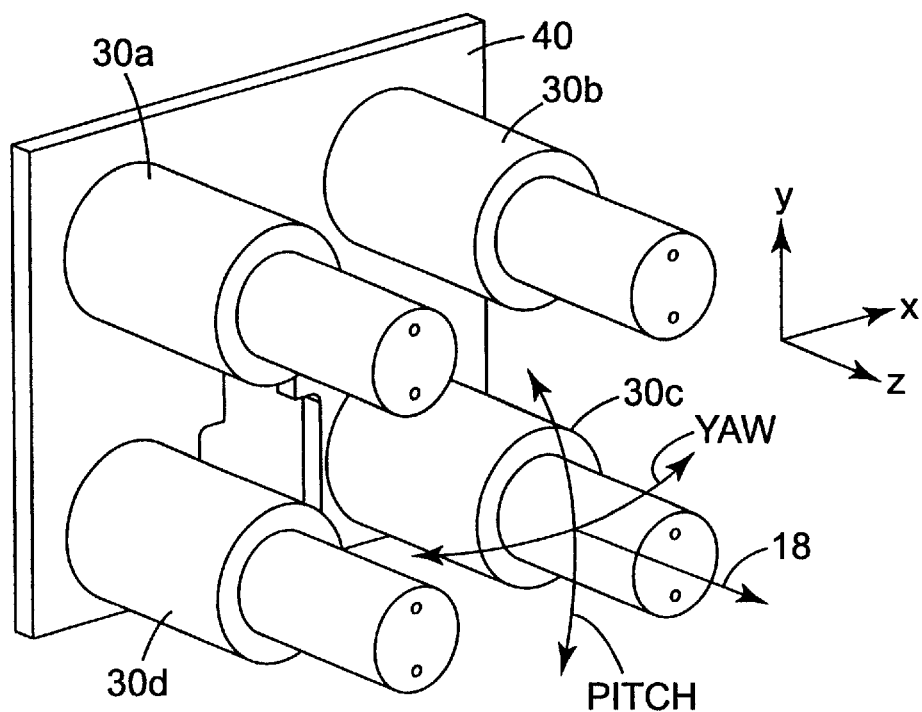
FIG. 3 illustrates the concepts of pitch, yaw and translation with respect to the drive system of FIGS. 1 and 2.

FIG. 2 is a schematic diagram of the drive system of FIG. 1 viewed along the direction of movement of the optics sled 10. The optics sled 10 possesses a centroidal axis 18 that is defined by its center of mass and the direction of movement of the optics sled 10. As used in connection with the present invention, the centroidal axis is the line along which the center of mass of the optics sled 10 moves during operation of the laser servowriting system. As best seen in FIG. 3, it is preferred that the centroidal axis 18 be parallel to the z-axis. That centroidal axis 18 is depicted as a point in FIG. 2 because the view is taken directly along that axis.

The depicted system includes four actuators 30 that are located about the centroidal axis 18 and are preferably equidistant from the centroidal axis 18 in the x-y plane depicted in FIG. 2. It may be preferred that the actuators 30 also be equally spaced about the centroidal axis 18, i.e., for a four actuator system as shown in FIGS. 1 and 2, the actuators 30 are preferably located at 90 degree intervals about the centroidal axis 18. By positioning the actuators 30 equidistant from and equally spaced about the centroidal axis 18, control over the pitch, yaw and translational movement of the optics sled 10 may be simplified.

FIG. 3 schematically illustrates the concepts of pitch and yaw in connection with a system including four actuators 30. Pitch can be described as a measure of the inclination/declination of the optics sled 10, i.e., rotation about the x-axis (with reference to the coordinate system used in FIGS. 1–3). Yaw can be described as a measure of the rotation of the optics sled 10 about the y-axis.

Figure 4:
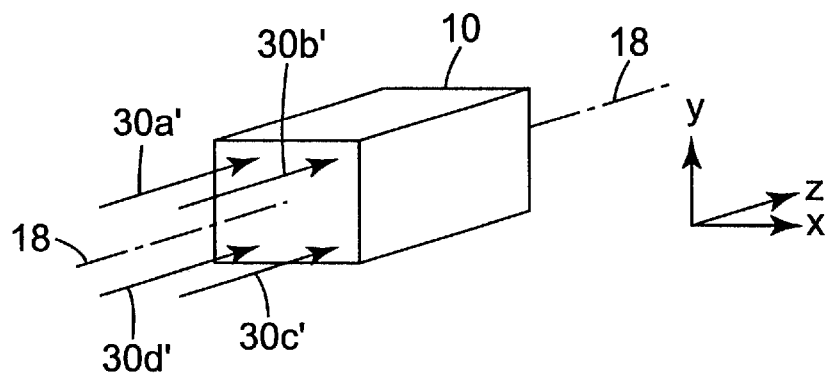
FIG. 4 is a diagram of the drive system of FIGS. 1–3 illustrating the actuator forces and the centroidal axis of the optics sled.
Figure 5A:
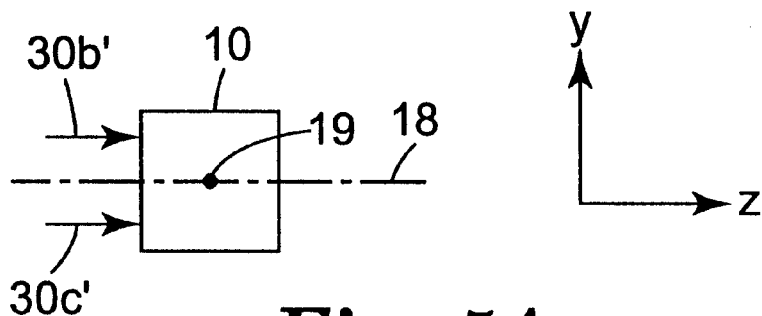
FIGS. 5A–5C are views of the diagram of FIG. 4 taken from different perspectives to illustrate the spatial relationships between the actuator forces and the centroidal axis.
Figure 5B:
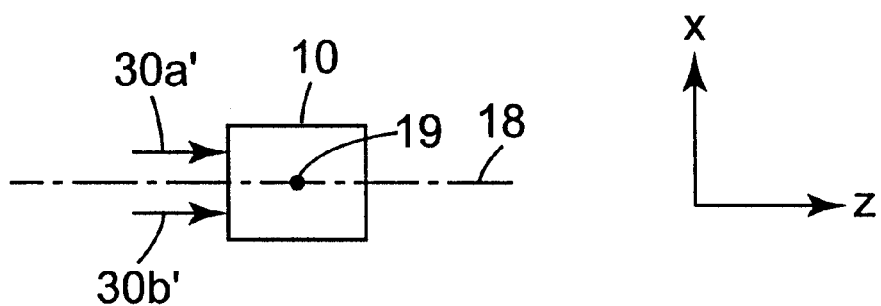

FIG. 4 illustrates the system of FIGS. 1–3 in which the actuators 30a–30d are represented by a group of force vectors 30a'–30d' operating on optics sled 10. Also depicted in FIG. 4 is a centroidal axis 18 and x-y-z reference axes. FIG. 5A is a view of the system of FIG. 4 taken along the x-axis, in which the center of mass 19 of the optics sled 10 is depicted on centroidal axis 18. Only two force vectors, 30b' and 30c' are illustrated in FIG. 5A because the other force vectors are hidden in the perspective along which FIG. 5A is taken. FIG. 5B is a view of the system of FIG. 4 taken along the y-axis. The center of mass 19 of optics sled 10 is located on the centroidal axis 18 and only force vectors 30a' and 30b' are seen in FIG. 5B because the remaining force vectors are hidden.

Figure 5C:
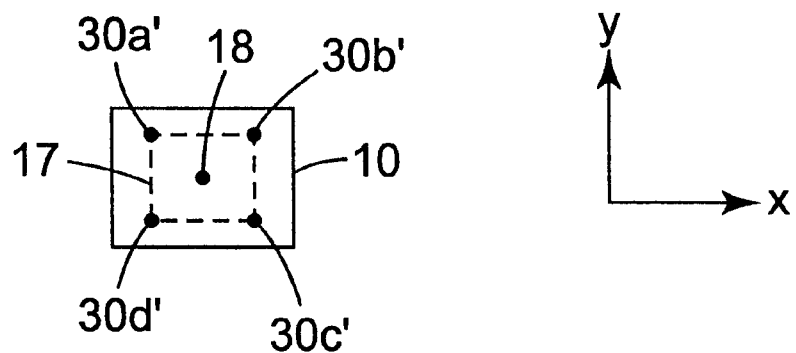

FIG. 5C is a view of the system of FIG. 4 taken along the z-axis which is parallel to the centroidal axis 18. The view of FIG. 5C is in the same direction as force vectors 30a'–30d' and illustrates an important feature of the present invention. That feature is the location of the centroidal axis 18 with respect to the locations of the axes along which the force vectors 30a'–30d' operate.

All of the systems of the present invention include at least three actuators, although the system illustrated in FIG. 5C includes four actuators operating on the optics sled represented by force vectors 30a'–30d'. If a plane geometric FIG. 17 is drawn by connecting each of the force vectors 30a'–30d' on a reference plane that is preferably perpendicular to the centroidal axis 18, the intersection of the centroidal axis 18 with that reference plane is located within the FIG. 17 defined by the force vectors 30a'–30d'. The centroidal axis 18 may preferably be located near the center of the FIG. 17.

By locating the centroidal axis 18 within the FIG. 17, the force vectors 30a'–30d' can be adjusted to balance the forces such that any moments induced in the optics sled 10 by imbalances in the force vectors about the pitch and yaw axes are reduced or eliminated. Referring to FIGS. 4 and 5A, balancing the force vectors located on both sides of the centroidal axis 18 will reduce or prevent moments induced by the force vectors 30*a*'–30*d*' about the x-axis. Likewise, balancing the force vectors located on both sides of the centroidal axis 18 as seen in FIG. 5B will reduce or prevent moments induced by the force vectors 30*a*'–30*d*' about the y-axis.

Figure 6A:
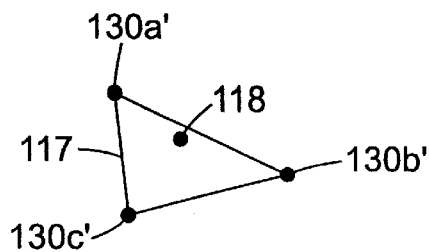
FIGS. 6A–6C illustrate the spatial relationships between the actuators forces and centroidal axes of alternative drive systems in a reference plane.
Figure 6B:
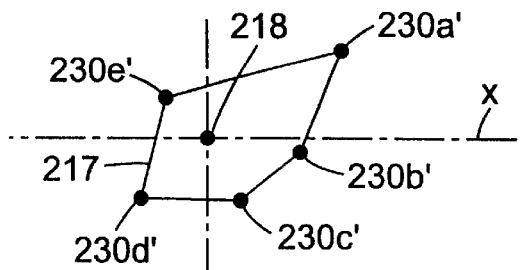
Figure 6C:
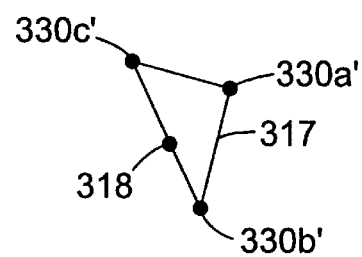

FIGS. 6A–6C are schematic representations of other arrangements of actuators and centroidal axes that could be provided in connection with the present invention. All of the figures depict the centroidal axis and the actuators surrounding the centroidal axis as points located on, e.g. a reference plane that is perpendicular to the centroidal axis. In FIG. 6A, the centroidal axis 118 is located within the plane geometric FIG. 117 formed by three force vectors 130*a*'–130*c*' provided by three actuators (not shown). As seen in FIG. 6A, the centroidal axis 118 need not necessarily be located near the center of the geometric figure 117. In addition, the figure 117 need not be regular, i.e., it may have sides of varying length and angles that are not congruent.

FIG. 6B illustrates a system in which the centroidal axis 218 is located within a group of five force vectors 230*a*'–230*e*' that, when connected, form a plane geometric figure 217. FIG. 6B also includes x and y axes that intersect at the centroidal axis 218 on the reference plane on which the figure 217 is formed. The x & y axes are preferably perpendicular to each other. The x axis will be referred to here as the pitch axis and the y axis will be referred to as the yaw axis. In other words, rotation of an optics sled about the x axis will affect the pitch of the optics sled while rotation about the y axis will affect the yaw of the optics sled.

It is preferred that at least one force vector, i.e., actuator be located on both sides of the pitch axis (x-axis) and it is also preferred that at least one actuator be located on both sides of the yaw axis (y-axis). As a result, varying the forces provided by the actuators on the opposing sides of the pitch and yaw axes can be used to reduce or prevent moments about those axes, thereby reducing or preventing vibration induced by those moments.

FIG. 6C illustrates another system in which a group of force vectors 330*a*'–330*c*' forms a plane geometric figure 317 and the centroidal axis 318 of an optics sled (not shown) is located on one of the sides of that figure 317. For the purposes of the present invention, such a location will be considered to lie "within" the plane geometric figure 317 and all of the advantages discussed herein can be obtained in such systems.

Figure 7:
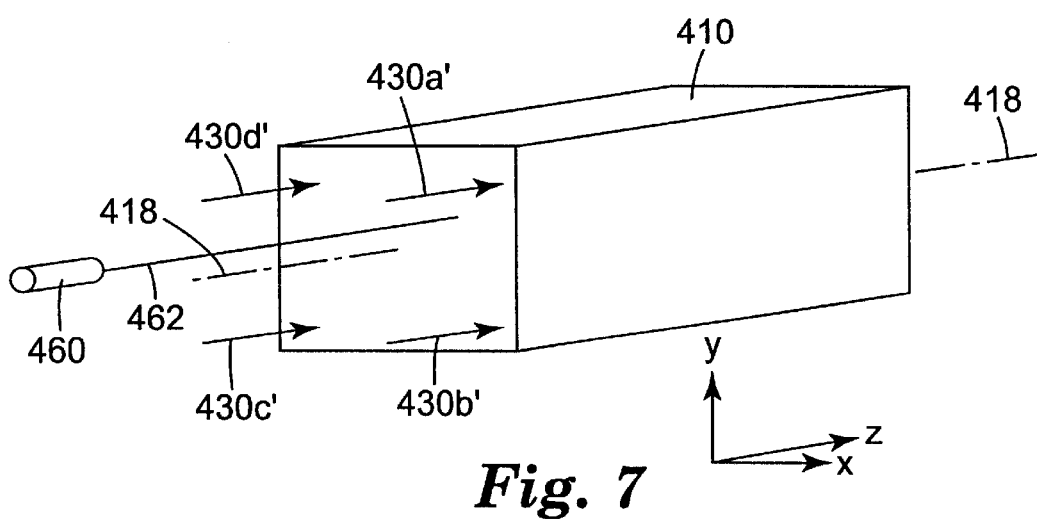
FIG. 7 is a perspective view of a drive system including a position indicator.

FIG. 7 is a schematic diagram of one system according to the present invention incorporating a position indicator 460 for determining the position and attitude of the optics sled 410 with respect to the centroidal axis 418. The optics sled 410 is moved along the centroidal axis 418 by a group of four actuators represented in FIG. 7 by four force vectors 430*a*'–430*d*'. The position indicator 460 determines the position of the optics sled 410 along a position indicator axis 462 that is preferably generally aligned with the centroidal axis 418. It is further preferred that the position indicator axis 462 be offset from the centroidal axis 418, i.e., that the two axes do not lie along the same line.

Figure 8:
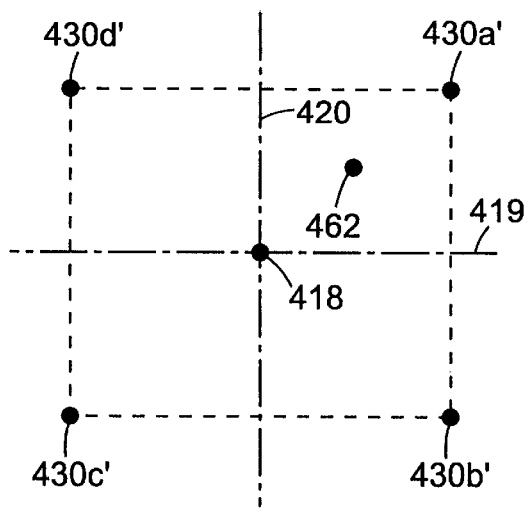
FIG. 8 illustrates the spatial relationship between the actuator forces, the centroidal axis and an axis along which the position indicator of FIG. 7 operates.

FIG. 8 is a view of the system of FIG. 7 taken along the centroidal axis 418 (which appears as a point in FIG. 8). In other words, FIG. 8 depicts a reference plane that is perpendicular to the centroidal axis 418. The force vectors 430*a*'–430*d*' form a plane geometric figure 417 in the reference plane of FIG. 8. The position indicator axis 462 and the centroidal axis 418 are both preferably located within the FIG. 417.

As discussed above, it is preferred that the position indicator axis 462 be offset from the centroidal axis 418. It is further preferred that the position indicator axis 462 be offset from the pitch axis 419 and the yaw axis 420, i.e., that the position indicator axis 462 does not intersect either the pitch axis 419 or the yaw axis 420.

Figure 9:
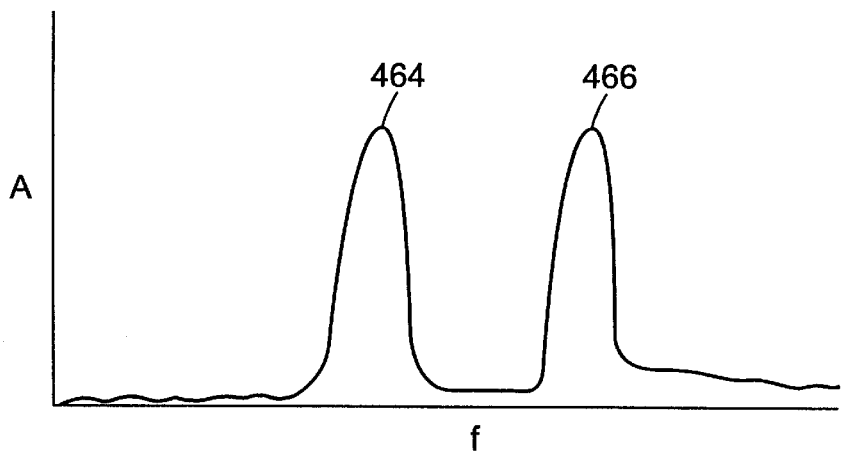
FIG. 9 is a graph illustrating the output of a laser interferometer when used as a position indicator in the system of FIG. 7.

If the position indicator 460 is, e.g., a laser interferometer, its output can also be used to determine whether the optics sled 410 is vibrating. The output from an interferometer is illustrated graphically in FIG. 9 with the frequency plotted along the horizontal axis and amplitude plotted along the vertical axis. The output of the interferometer position indicator 460 that is offset from the centroidal axis 418, as well as the pitch axis 419 and yaw axis 420, includes two peaks 464 and 466 representative of vibrations about the pitch axis 419 and the yaw axis 420, respectively. The peaks 464 and 466 are separated because the natural frequency of the optics sled is different about each of the pitch and yaw axes 419 and 420, thereby providing the ability to discern between the two vibration modes.

It is preferred that the position indicator axis 462 be offset from the axes 419 and 420 because, if the position indicator axis 462 intersects one of the axes 419 or 420, only one of the peaks would be produced. For example, if the position indicator axis 462 intersected the pitch axis 419, vibrations about that axis would not be detected by the position indicator 460. As a result, peak 464 in the graph of FIG. 9 would not be produced. Corresponding results would be produced if the position indicator axis 462 intersected the yaw axis 420.

Because vibration about the pitch and yaw axes 419 and 420 produce two peaks 464 and 466, the system can be selectively tuned to reduce or eliminate vibrations about each of the axes 419 and 420 separately. By tuning the system to balance the force vectors 430*a*'–430*d*' produced by each actuator such that moments about the pitch and yaw axes 419 and 420 are reduced or eliminated, the amplitude of the peaks associated with vibrations about the pitch and yaw axes 419 and 420 will also be reduced or eliminated.

In addition to the laser interferometer described above, other devices could be used that would also provide the data discussed above. One example of an alternative device is a high resolution linear encoder in which the encoder scale is located in the same position as position indicator axis 462 and would move with the optics sled.

Figure 10:
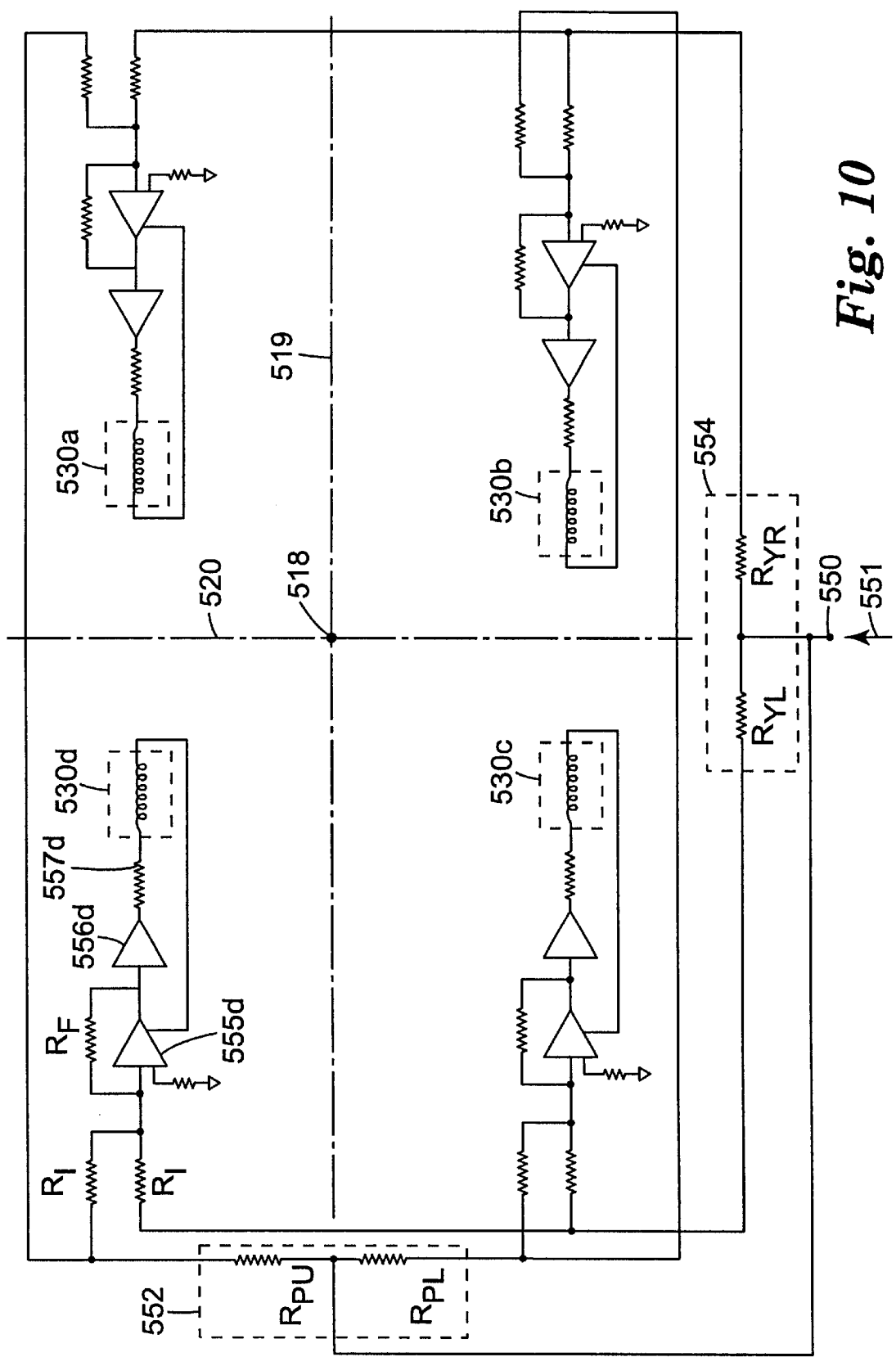
FIG. 10 is a schematic diagram of one analog control system for controlling the actuators in an optics drive system using four actuators.

FIG. 10 illustrates one embodiment of a control system useful for adjusting the forces in a drive system using four actuators 530*a*–530*d* to reduce vibrations induced by the forces provided by the actuators 530*a*–530*d*. Although the control system is illustrated as an analog circuit, it will be understood that control over the actuators 530*a*–530*d* could be implemented in analog, digital or a combination of analog and digital controls. Where digital control systems are used, they may be implemented in hardware, software or a combination of hardware and software.

The optics sled moved by the actuators 530*a*–530*d* may vibrate if the actuators operate on the optics sled with unbalanced forces, i.e., forces that do not combine to provide a resultant force directed along the centroidal axis of the optics sled. To address that problem, variable gains can be used in connection with the signals used to drive each of the actuators 530*a*–530*d* to adjust the forces applied by each actuator 530*a*–530*d* such that the resultant force of all of the actuators 530*a*–530*d* acts along or near to the centroidal axis of the optics sled. When the force vectors of the actuators 530*a*–530*d* are properly adjusted, moment-induced vibration of the optics sled caused by the actuators 530a–530d can be reduced or eliminated.

A centroidal axis 518 (seen as a point), pitch axis 519 and yaw axis are reproduced with the control circuit illustrated in FIG. 10 to assist in understanding operation of the invention. The pitch control 552 can be used to vary the gain of the amplifiers providing signals to the actuators 530a and 530d located above the pitch axis 519 as compared to the gain of the amplifiers providing signals to the actuators 530b and 530c located below the pitch axis 519. The gains are varied based on the ratio between the resistors $R_{PU}$ and $R_{PL}$ in the pitch control 552.

The ratio of $R_{PU}$:$R_{PL}$ can be adjusted in a variety of manners. For example, the pitch control 552 may be provided as a potentiometer and adjusted manually, or some automated method of varying the ratio of $R_{PU}$:$R_{PL}$ automatically in a closed loop control system may be implemented. The laser interferometer (or equivalent device as discussed above in connection with the position indicator 460) can provide the desired information regarding vibrations induced around the pitch axis 519, thereby providing the opportunity to reduce or eliminate those vibrations manually or automatically.

Regardless of the actual method used to modify that ratio, its adjustment varies the gain on the signals provided to the upper actuators (530a and 530d) as compared to the lower actuators (530b and 530c). By properly adjusting the ratio of $R_{PU}$:$R_{PL}$, a balance in the forces provided by the actuators on opposite sides of the pitch axis 519 can be obtained that reduces or eliminates vibrations induced by moments about the pitch axis 519.

Similarly, the yaw control 554 can be used to vary the gain of the amplifiers providing signals to the actuators 530a and 530b located on the right side of the yaw axis 520 as compared to the gain of the amplifiers providing signals to the actuators 530c and 530d located on the left side of the yaw axis 520. The gains are varied based on the ratio between the resistors $R_{YR}$ and $R_{YL}$ in the yaw control 554. The ratio of $R_{YR}$:$R_{YL}$ can be adjusted in a variety of manners similar to those discussed with respect to the pitch control 552. Regardless of the actual method used to modify that ratio, its adjustment varies the gain on the signals provided to the right side actuators (530a and 530b) as compared to the left-side actuators (530c and 530d). By properly adjusting the ratio of $R_{YR}$:$R_{YL}$, a balance in the forces provided by the actuators on opposite sides of the yaw axis 520 can be obtained that reduces or eliminates vibrations induced by moments about the yaw axis 520.

Actuators 530a–530d are each illustrated as having a characteristic inductance which is a property of the preferred actuators. If other actuators are used, it will be understood that their electrical characteristics may differ. The illustrated circuit receives an input signal 551 indicative of a desired acceleration rate, velocity or similar characteristic for moving the optics sled (not shown). That signal 551 is received at input 550 and divided between the pitch and yaw controls 552 and 554.

At the pitch control 552, the signal is divided between the upper actuators (530a and 530d) and lower actuators (530b and 530c) based on the ratio $R_{PU}$:$R_{PL}$ as discussed above. At the yaw control 554, the signal is divided between the right side actuators (530a and 530b) and the left-side actuators (530c and 530d). As a result, each of the actuators 530a–530d receives two inputs, one from the pitch control 552 and one from the yaw control 554.

With respect to actuator 530d, the signals from the pitch and yaw controls 552 and 554 are summed and fed to the amplifier 555d which, in turn, feeds a voltage to current converter 556d that converts the voltage signal to current. The current signal is then provided to the actuator 530d through resistor 557d. The gain on the signal provided to the amplifier 555d varies based on the ratios of the resistors in the pitch and yaw controls 552 and 554. The gain on the signal provided to the actuator 530d can be expressed as follows:

$$G=R_f(R_{PU}+R_{YL})/((R_{PU}*R_{YL})+R_f)$$

The gain provided by the control circuit for actuator 530d is illustrative of the gains provided by the control circuit illustrated in FIG. 10, and it will be understood that the discussion could be applied to other actuators 530a–530c with minor modifications.

Figure 11:
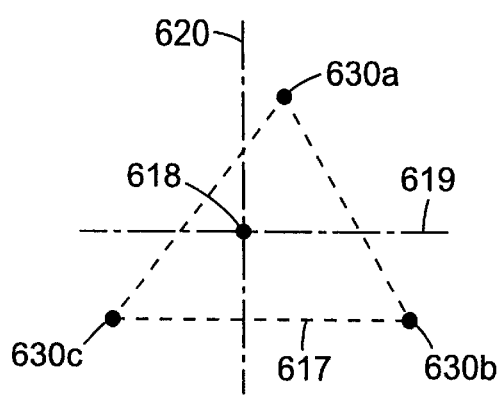
FIG. 11 illustrates the spatial relationship between actuator forces and a centroidal axis of another optics drive system using three actuators.

FIG. 11 illustrates a drive system including three actuators represented by force vectors 630a–630c in which the optics sled has a centroidal axis 618 located within the plane geometric FIG. 617 formed between the force vectors 630a–630c. Also illustrated in FIG. 10 is a pitch axis 619 extending through the centroidal axis 618 and a yaw axis 620 that also extends through the centroidal axis 618.

Figure 12:
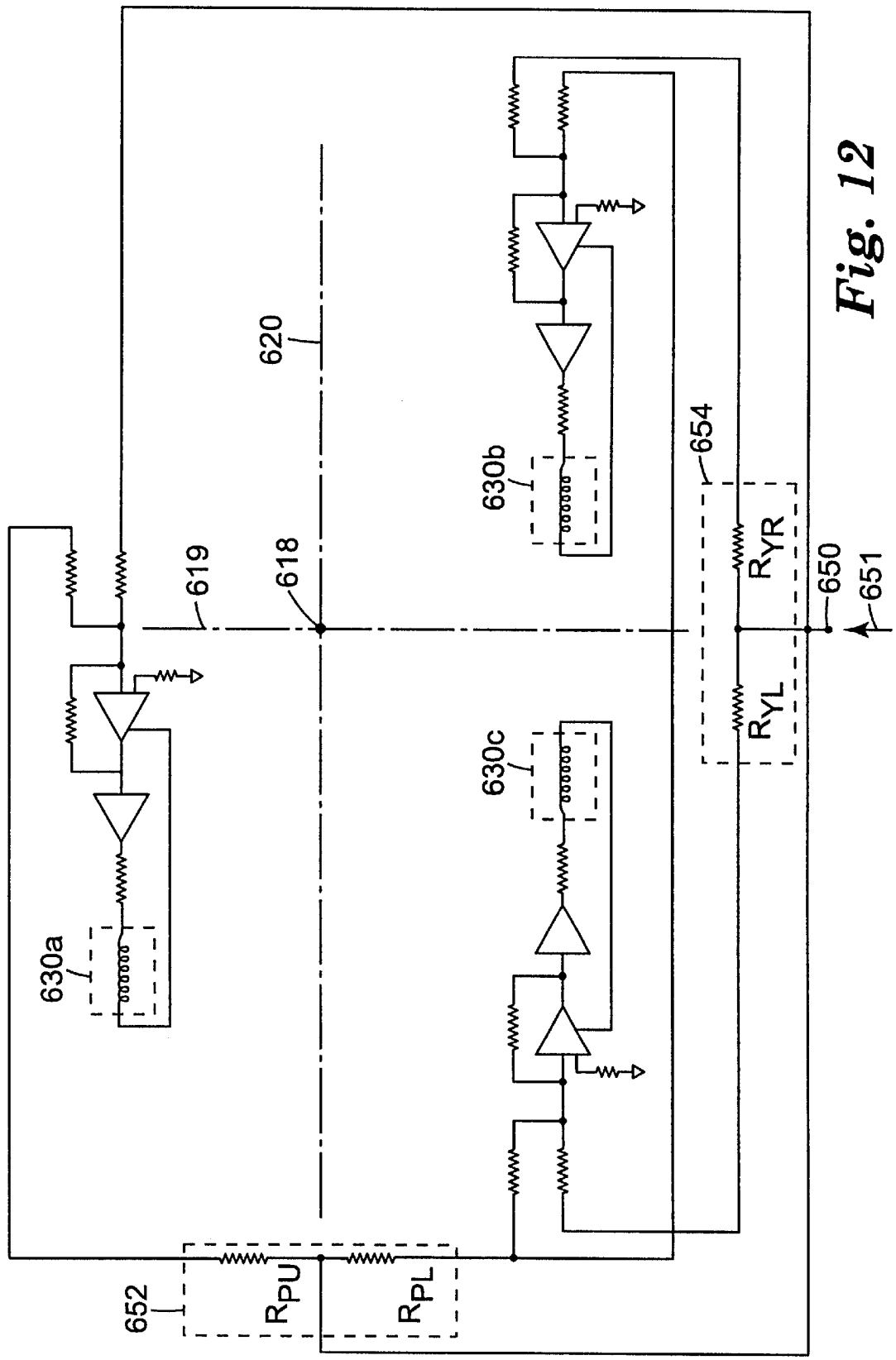
FIG. 12 is a schematic diagram of one analog control system for controlling the actuators in an optics drive system using three actuators.

FIG. 12 illustrates an analog control system that can be used in connection with a three actuator drive system as illustrated in FIG. 11. In many respects, the three actuator control system of FIG. 11 is similar to the four actuator control system illustrated in FIG. 9. The primary difference is that the pitch control, i.e., adjustment of the forces above and below the pitch axis 619, is accomplished using only one actuator 630a located above the pitch axis 619. Gain control over the signal used to drive the upper actuator 630a is accomplished using only the pitch control 652.

Yaw control, i.e., adjustment of the forces on the right and left sides of the yaw axis 620, is accomplished using only the lower actuators 630b and 630c. Gain control over the signals used to drive the lower actuators 630b and 630c is accomplished using the yaw control 654.

The upper actuator 630a is depicted as offset from the yaw axis 620. The resulting imbalance in the forces on the right and left sides of the yaw axis 620 caused by the offset of the upper actuator 630a can be compensated for by adjusting the forces produced by the lower actuators 630b and 630c (via gain control as discussed above).

The drive systems discussed above have included three to five actuators. It should, however, be understood that the drive systems according to the present invention could include more than five actuators. At a minimum, however, the drive systems include three actuators to provide the desired control over pitch and yaw as discussed above.

In addition, various modifications and alterations of this invention will become apparent to those skilled in the art without departing from the scope of this invention, and it should be understood that this invention is not to be unduly limited to the illustrative embodiments and methods set forth herein.

What is claimed is:

1. A laser servowriting system for providing a servo pattern on a magnetic data storage disk, the system comprising:

a linear guide;

an optics sled including laser optics, the optics sled mounted on the linear guide for translational movement, wherein the center of mass of the optics sled moves along a centroidal axis as the optics sled moves along the linear guide;

three or more actuators operatively connected to the optics sled, wherein the actuators move the optics sled along the linear guide, and further wherein the centroidal axis is located within a closed geometric figure formed on a reference plane perpendicular to the centroidal axis by the actuators;

a laser source directing laser energy at the laser optics on the optics sled; and a rotation system for rotating a magnetic data storage disk during servowriting of an optical stitch pattern thereon.

2. The system of claim 1, wherein the actuators are evenly spaced about the centroidal axis as measured on the reference plane.

3. The system of claim 1, wherein only three actuators are provided.

4. The system of claim 1, wherein the actuators are located equidistant from the centroidal axis as measured on a reference plane perpendicular to the centroidal axis.

5. The system of claim 1, wherein the actuators comprise voice coils.

6. The system of claim 1, wherein the linear guide comprises an air bearing slide.

7. The system of claim 1, further comprising a position indicator for determining the position of the optics sled along the centroidal axis.

8. The system of claim 7, wherein the position indicator acts along a position indicator axis is offset from the centroidal axis as measured on a reference plane perpendicular to the centroidal axis.

9. The system of claim 8, wherein the actuators form a closed geometric figure on a reference plane perpendicular to the centroidal axis, and further wherein the centroidal axis and the position indicator axis are located within the closed geometric figure on the reference plane.

10. The system of claim 9, further comprising a pitch axis on the reference plane that intersects the centroidal axis and a yaw axis on the reference plane that intersects the centroidal axis and that is perpendicular to the pitch axis, wherein the position indicator axis is offset from both the pitch axis and the yaw axis.

11. A method of moving optics in a laser servowriting system, the method comprising:

providing an optics sled mounted on a linear guide for translational movement, wherein the center of mass of the optics sled moves along a centroidal axis as the optics sled moves along the linear guide;

providing three or more actuators operatively connected to the optics sled, each of the actuators producing an actuator force to move the optics sled along the linear guide, wherein the centroidal axis is located within a closed geometric figure formed on a reference plane perpendicular to the centroidal axis by the actuators; and varying the actuator force provided by at least one of the actuators.

12. The method of claim 11, wherein varying the actuator force comprises:

providing a drive signal to each of the actuators; and varying a gain for at least one of the drive signals.

13. The method of claim 11, wherein at least one of the actuators is located on each side of a pitch axis, and further wherein at least one of the actuators is located on each side of a yaw axis, whereby varying the actuator force of at least one of the actuators adjusts at least one moment produced by the actuator forces about at least one of the pitch and yaw axes.

14. The method of claim 11, further comprising determining the position of the optics sled with a position indicator.

15. The method of claim 14, wherein the position of the optics sled is measured along a position indicator axis that is offset from the centroidal axis as measured on a reference plane perpendicular to the centroidal axis.

16. The method of claim 15, wherein the actuators form a closed geometric figure on a reference plane perpendicular to the centroidal axis, and further wherein the centroidal axis and the position indicator axis are located within the closed geometric figure on the reference plane.

17. The method of claim 16, further comprising a pitch axis on the reference plane that intersects the centroidal axis and a yaw axis on the reference plane that intersects the centroidal axis and that is perpendicular to the pitch axis, wherein the position indicator axis is offset from both the pitch axis and the yaw axis.

18. The method of claim 17, wherein the position indicator comprises a laser interferometer.

19. The method of claim 18, further comprising sensing vibration of the optics sled about the pitch and yaw axes using the laser interferometer.

20. The method of claim 11, further comprising forming a servo pattern on a magnetic data storage disk while varying the actuator force.

21. A drive system for moving the optics in a laser servowriting system, the system comprising:

a linear guide;

an optics sled including laser optics, the optics sled mounted on the linear guide for translational movement, wherein the center of mass of the optics sled moves along a centroidal axis as the optics sled moves along the linear guide; and three or more actuators operatively connected to the optics sled, wherein the actuators move the optics sled along the linear guide, and further wherein the centroidal axis is located within a closed geometric figure formed on a reference plane perpendicular to the centroidal axis by the actuators.

22. The system of claim 21, wherein only three actuators are provided.

23. The system of claim 21, wherein the actuators comprise voice coils.

24. The system of claim 21, wherein the linear guide comprises an air bearing slide.

25. The system of claim 21, further comprising a position indicator for determining the position of the optics sled along the centroidal axis.

26. The system of claim 25, wherein the position indicator acts along a position indicator axis is offset from the centroidal axis as measured on a reference plane perpendicular to the centroidal axis.

27. The system of claim 26, wherein the actuators form a closed geometric figure on a reference plane perpendicular to the centroidal axis, and further wherein the centroidal axis and the position indicator axis are located within the closed geometric figure on the reference plane.

28. The system of claim 27, further comprising a pitch axis on the reference plane that intersects the centroidal axis and a yaw axis on the reference plane that intersects the centroidal axis and that is perpendicular to the pitch axis, wherein the position indicator axis is offset from both the pitch axis and the yaw axis.

* * * * *